United States Patent [19]

Tibolla

[11] 4,217,619

[45] Aug. 12, 1980

[54] TRANSIENT VOLTAGE SURGE SUPPRESSING DEVICE

[75] Inventor: Julius F. Tibolla, Yardley, Pa.

[73] Assignee: GTE Sylvania Wiring Devices Incorporated, Trenton, N.J.

[21] Appl. No.: 912,625

[22] Filed: Jun. 5, 1978

[51] Int. Cl.[2] .......... H02H 3/20

[52] U.S. Cl. .......... 361/56; 361/91; 361/111; 339/111

[58] Field of Search .......... 361/56, 91, 88, 110, 361/111, 117, 118, 119, 331, 332, 334, 356; 339/122, 176 R, 125 R, 111, 14 P; 174/53, 55, 58, 67; 337/271, 206, 216, 265; 338/220, 221, 21, 20; 200/51 R

[56] References Cited

U.S. PATENT DOCUMENTS

| | | | |
|---|---|---|---|
| 2,277,216 | 3/1942 | Epstein | 337/216 X |
| 3,746,877 | 7/1973 | Seiter et al. | 174/55 X |
| 3,821,686 | 6/1974 | Harnden, Jr. | 338/21 |
| 4,071,872 | 1/1978 | Phillips, Jr. | 361/56 |
| 4,075,676 | 2/1978 | Phillips, Jr. | 361/56 |

OTHER PUBLICATIONS

"Transient Voltage Suppression Manual" General Electric, Chapter III, pp. 19–22 and 89.

"Solid-State Power Conversion," Sep. -Oct. 1976, Update Transient Suppressors, pp. 16–20 and 39.

*Primary Examiner*—Patrick R. Salce

*Attorney, Agent, or Firm*—Frederick A. Zoda; John J. Kane; Albert Sperry

[57] ABSTRACT

A device for suppressing transient voltage surges is mountable at the end of a branch circuit in place of a conventional duplex receptacle. When so mounted, the device in external configuration duplicates the duplex receptacle exactly, except for omission of one of the two sets of slots normally provided for receiving the prongs of attachment plugs. The device, when mounted in a conventional outlet box, receives a conventional duplex receptacle wall plate, and being of the external configuration matching that of a conventional duplex receptacle, provides no projection beyond the wall plate greater than the projection defined by the raised portions of an ordinary duplex receptacle as heretofore known. Use of completely conventional duplex receptacle components, modified either not at all or only slightly, is permitted. The cover of the device is modified only to the extent of omitting the prong receiving slots at one end, and providing an internal recess for engaging the suppressor element and holding the same in proper position within the body of the device. The body of the device is modified only to the extent of providing a continuous, transverse suppressor element compartment at one end instead of the separate compartments normally provided of the receptacle contacts. Receptacle contact strips are utilized, modified only in that at one end thereof, two of the contact leaves normally provided are omitted, and the remaining leaf is adapted to constitute a wire lead terminal to which is connectable the ends of the suppressor element.

7 Claims, 5 Drawing Figures

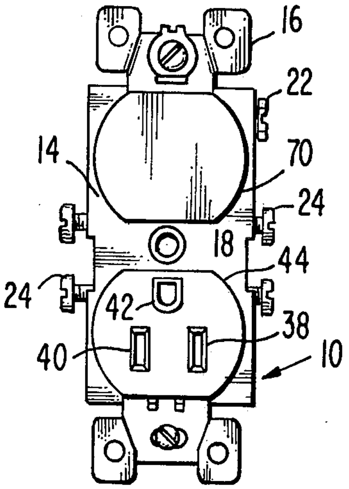
Fig-1
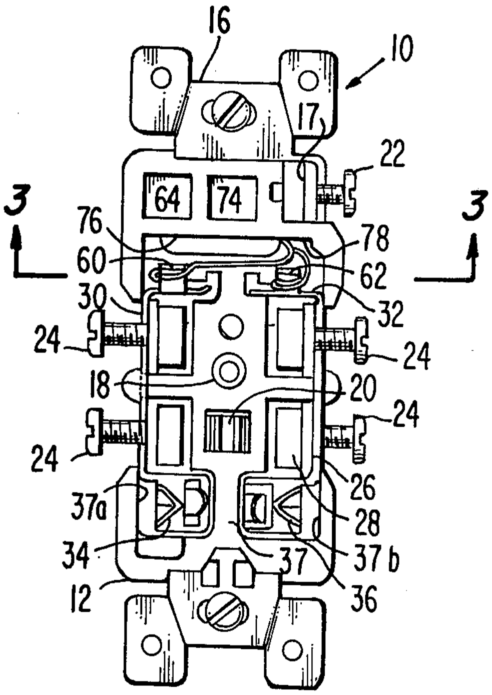
Fig-2
Fig-3
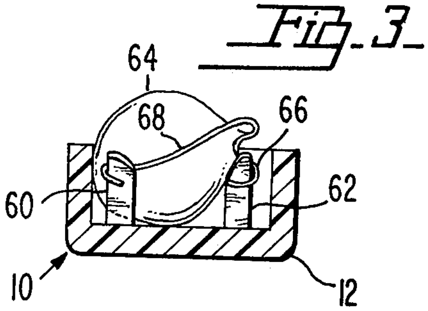
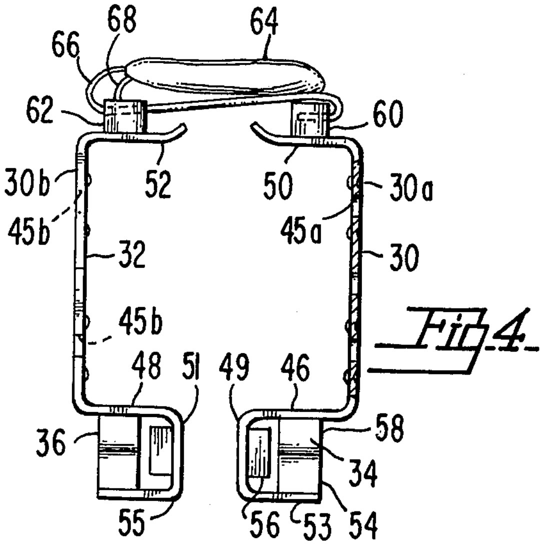
Fig-4
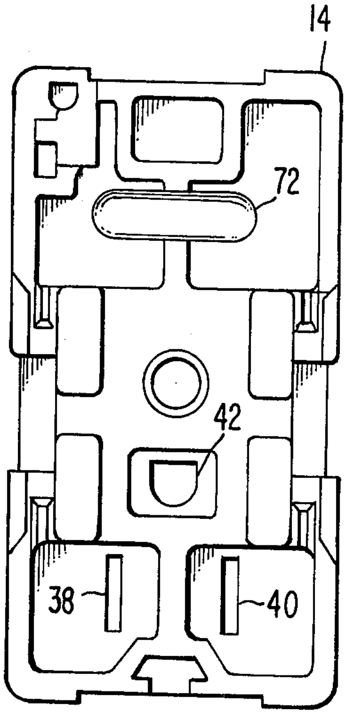
Fig-5

TRANSIENT VOLTAGE SURGE SUPPRESSING DEVICE

BACKGROUND OF THE INVENTION

1. Field of the Invention

The invention is an electrical receptacle, of the type adapted to receive the prongs of the attachment plug of an electrical appliance such as a television receiver or other device to be protected against transient voltage surges. The device, in carrying out its function of a receptacle connectable at the end of a branch circuit in place of an ordinary duplex receptacle, incorporates, interiorly thereof, a voltage surge suppressor element known per se and available on the open market.

The invention, accordingly, builds into one permanently assembled device the functions both of a receptacle for an electrical appliance, connectable at the end of a branch circuit, and the function of protecting any electrical appliance plugged into the receptacle from transient surges of voltage such as occur, for example, during an electrical storm.

2. Description of the Prior Art

Heretofore, it has been known to provide devices for the purpose of protecting electrical appliances against transient surges of voltage. For example, protector devices are known, which have prongs that plug into an ordinary duplex receptacle, and which incorporate voltage surge suppressor elements. A device of this type, when plugged into a receptacle, has female contacts adapted to receive the prongs of the attachment plug of an electrical appliance such as a television receiver, electric organ, stereo amplifier, and other types of solid state equipment.

These devices have the disadvantage that they project in an unsightly fashion from the ordinary duplex receptacle. Electrically, also, devices of this type leave something to be desired. A poor electrical connection may occur between the prongs of the protector and the female contacts of the duplex receptacle. Another poor electrical connection may be made between the female contacts of the protector and the plugs of the electrical appliance.

Still further, a protector of the type stated has the disadvantage that it can be removed and dispensed with by unauthorized individuals and indeed offers the temptation that where one may desire to use both ends of the duplex receptacle, the tendency is to remove the protector as a result of which the electrical appliances go without the protection against transient surges of voltage.

Further, in the prior art, the manufacture of a transient voltage surge suppression device has usually involved the manufacture of a completely separate wiring device, having the basic construction features described above. This has involved the construction of completely new molds, for manufacture of the protector housing. The construction of the protector as a completely separate device has also involved the need for completely separate dies for manufacturing the contacts, and, of course, a completely separate assembly procedure.

SUMMARY OF THE INVENTION

Summarized briefly, the invention disclosed and claimed herein has as its main object the elimination or at least the appreciable reduction of the prior art deficiencies noted above. Accordingly, it is proposed in carrying out the invention to provide a device for suppressing transient voltages surges, which is capable of installation in direct substitution for a completely conventional duplex receptacle. As is well known, a duplex receptacle has standard dimensions, and an external configuration, designed to permit its installation in an ordinary electrical outlet box of a commercial or residential circuit. Further, an ordinary duplex receptacle has a conventional cover configuration, which is adapted to permit mounting of a completely conventional wall plate, with projection of the receptacle beyond the wall plate surface being limited to a small fraction of an inch.

The device comprising the present invention thus includes a body which is exteriorly configured identically to that of a duplex receptacle, as regards location of the binding head screws, whereby the device is adapted to be installed at the end of an ordinary branch circuit. Forming the body in a configuration exactly duplicating that of a conventional receptacle permits the use of molds that are identical to or indeed are the same molds that are used in the manufacture of conventional duplex receptacle bodies, with modification of the body being required only to a very small extent, and being achieved through such simple expedients as, for example, a secondary manufacturing operation.

The same is true of the cover of the device, which is in exact duplication, exteriorly, of the cover of an ordinary duplex receptacle. Again, use of the same tooling as is required for molding of receptacle covers is permitted. The only change is in the elimination of the prong-receiving slots normally provided at one end of the cover, and in forming a recess either in a secondary manufacturing operation, or by means of a relatively simple mold change needed for molding of the interior surface of the cover, to permit it to receive and properly position the voltage surge suppressor element.

The device further includes duplex receptacle contact strips, which again are capable of being made with the same dies as are used for manufacture of completely conventional contact strips, the strips being put through a simple secondary operation whenever they are being used for the device comprising the present invention.

Thus, the invention includes a conventional duplex receptacle housing so far as the exterior shape is concerned, duplicating that of a conventional duplex receptacle in every respect exteriorly, except for blanking out of one of the raised portions of the cover of the housing. Interiorly, the device again duplicates that of a conventional duplex receptacle, except that the contact leaves at one end of the contact strips are eliminated, and in place thereof the invention incorporates a soldering terminal, to which is permanently secured, in a completely efficient electrical connection, the leads of a conventional voltage surge suppressor element of the varistor type. The body and the cover, though differing only slightly from those used in the manufacture of ordinary duplex receptacles, have cooperating, confronting means for engaging opposite edges of the varistor in such a fashion as to properly position the varistor transversely of the body, against undesired movement, so that there is a complete elimination of any possibility of weakening of the electrical connection between the varistor and the contact strips, at any time during the entire life of the voltage surge supression device.

BRIEF DESCRIPTION OF THE DRAWING

While the invention is particularly pointed out and distinctly claimed in the concluding portions herein, a preferred embodiment is set forth in the following detailed description which may be best understood when read in connection with the accompanying drawings, in which:

FIG. 1 is a top plan view of a device for suppressing transient surges of voltage, as made according to the present invention;

FIG. 2 is a top plan view of the device with the cover removed;

FIG. 3 is a transverse sectional view through the device, at the location of the voltage surge suppressor element thereof, taken substantially on line 3—3 of FIG. 2;

FIG. 4 is an enlarged plan view of the receptacle contact strips and the varistor, as they appear when assembled with one another preparatory to insertion in the body of the device; and FIG. 5 is an enlarged bottom plan view of the cover.

DETAILED DESCRIPTION OF THE PREFERRED EMBODIMENT

Designated generally by the reference numeral 10 is an electrical receptacle, in which has been incorporated the improved construction comprising the present invention.

This includes an electrically insulative, molded body 12, externally configured identically to conventional electrical duplex receptacle bodies in the sense of the dimensional requirements specified for the entire industry under standards established by NEMA (National Electrical Manufacturers Association), the National Electrical Code, and Federal Specifications.

A cover 14, also of molded electrically insulative material, is mounted on the body and cooperates with the body in defining a housing for the current-carrying components of the device. A mounting strap 16, also completely conventional as regards materials, dimensions, and the like prescribed by the standards established for the industry, in the present instance is of the wrap-around type, and is permanently assembled with the body and the cover by a rivet 18 or the like, which fixedly joins the body, cover, and strap together. Secured fixedly to the strap is a ground contact 20, which would be engageable by the grounding prong of a conventional attachment plug, not shown. Normally, two ground contacts would be secured to the strap, but in the present instance one of these is omitted, because one end of the cover is left blank, rather than being slotted, in a manner to be described in full detail hereinafter.

Also conventional is a laterally projecting, integral ear 17 of the strap 16, having an opening receiving a grounding screw 22, provided for connecting a ground wire of the house circuit should it be desired to ground the receptacle through said wire rather than through the connection of the mounting strap to the conventional electrical outlet box, not shown, in which the device would be mounted in use.

Also completely conventional in devices of this type are opposed pairs of binding head screws 24, threadedly engaged in rectangular, floating binding or terminal plates 26, in back of which there may be provided annular, soft rubber pads or cushions 28. The ground screw 22 is similarly threadedly engaged in a floating, cushionably backed binding plate.

In accordance with the present invention, opposite but identical contact strips 30, 32 are incorporated in the device. In accordance with the present invention, these include (see FIG. 4) elongated, electrically conductive metal strip members formed at one end with contacts 34, 36 adapted to receive the current-carrying prongs of an electrical plug. These strips, in accordance with the present invention, have contacts only at one end of the body, rather than at both ends as would be normal for the ordinary duplex receptacle.

Referring to FIG. 2, the body 12 is molded integrally with a longitudinally and centrally extending barrier 37, at one end of the body, dividing the body at said end into completely separated, opposite but identical contact-receiving compartments **37*a*, 37*b* respectively, in which the contacts 34, 36**, respectively, are positioned in the final, assembled condition of the device.

Cover 14 is formed with the usual parallel slots 38, 40 for the neutral and "hot" current-carrying prongs of the attachment plug. Adjacent the slots, and disposed upon the longitudinal center line of the body, is the conventionally configured ground contact slot 42, registered with the ground contact 20.

Slots 38,40,42 are formed in a completely conventionally configured and dimensioned raised portion 44 of the receptacle cover, said portion being adapted to be received in one of the correspondingly shaped openings of an ordinary duplex receptacle mounting plate, not shown.

Referring to FIG. 4, the elongated body portions **30*a*,30*b* of the strips 30,32 respectively are formed with spaced openings 45*a*,45*b*** adapted to loosely receive the binding head screws.

At one end, the body portions of the respective contact strips are integrally formed with laterally inwardly extending extensions or legs 46,48 respectively, which in turn merge into parallel extension leg portions 49,51 spaced closely apart and disposed in close proximity to the respective, opposite faces of the barrier 37, said portions 49,51 in turn merging into distal extremities 53,55 respectively. The contact leaves converge upwardly, with the leaves 34,54 being in direct contact and the leaf 56 being in close proximity thereto. All this is completely conventional construction in a receptacle contact, and does not per se comprise part of the present invention. The arrangement illustrated is one that permits the inserted current carrying prong to be effectively grasped by and between the several leaves of each contact strip, to provide a good electrical connection between the receptacle and the inserted attachment plug.

Contact strip 32, of course, has a similar construction as regards its prong-receiving contact means 36.

At their other ends, the contact strip body portions are integrally formed with inwardly directed legs 50,52. These are identical in every respect to the legs 46,48. However, legs 50,52 at their inner ends terminate, that is, at this end of the receptacle contact strip 30 or 32 as the case may be, there are no portions 49 or 51, or distal extremities 53,55. It follows that the contact leaves 56,54 are not provided at this end of each strip. Instead, a single leaf 60,62 of strips 30,32 respectively is provided, and said leaf is a truncated or cut off version of the corresponding leaves 58 provided at the other ends of the contact strips.

It will be noted at this point that the construction illustrated and described facilitates manufacture of the strips 30,32 in the same dies, and with the same tooling, as would be used when a production run is being made of a conventional duplex receptacle contact strip. All that is needed is a simple secondary operation in which the strips, after being made in the die, are cut at one end to remove portions 49,51 and extremities 53,55 together with leaves 54,56. This will produce the strips 30,32 rather than completely formed receptacle contact strips having, at both ends thereof, contacts such as the contacts 34,36 illustrated at one end only of the strips used in the present invention.

This is of particular importance, in that a wiring device company manufacturing the device can use the same basic tooling, to run contact strips both for conventional duplex receptacles and for the voltage surge suppressing device comprising the present invention.

At this point, it may be noted that this is also true with respect to the body 12 and cover 14. A body of the type illustrated is run in a production mold used for making conventional duplex receptacle bodies. In carrying out the present invention, the body used in the manufacture of an ordinary duplex receptacle, and the body used in manufacturing the present invention, differ only in that the barrier 37 normally provided at both ends of the device, is provided only at one end, with the other end being provided only with a partial barrier, by means of a simple secondary manufacturing operation performed on the initially conventional part. Similarly, in the cover, the mold would be identical both for ordinary duplex receptacles and for the manufacture of the present invention. One could provide interchangeable forces or cores for the mold, so that whenever covers are being molded for use in the assembly of transient voltage surge suppressing devices, the forces would be devoid of slot-forming projections at one end, so as to leave the raised portion of the cover completely blank or closed at said one end, and at the same time, in back of the closed end a suitable recess would be formed as will be presently described, for receiving the voltage surge suppressor element. Or, if desired one is readily permitted to form the recess, for example, by means of a secondary operation.

The suppressor element has been designated 64. It is preferred, in carrying out the present invention, to use a suppressor element of the varistor type. Specifically, it has been found that a varistor manufactured by the General Electric Company, as its model number V150LA20A is well suited for use in a voltage surge suppressing device mountable at the end of a branch circuit in the ordinary 115 A-120 V-AC circuit configuration.

The varistor type of transient voltage surge suppressing element has been found to be well suited for the purposes of the present invention. A varistor of this type is sold by the General Electric Company under a trademark "GE-MOV". The varistor is of the zinc-oxide type, and is a voltage dependent, symmetrical resistor that performs in a manner similar to back-to-back zener diodes in circuit protective functions, and offers distinct advantages in performance and economics.

The characteristic of a varistor of this type is that when exposed to a high energy voltage transient, the varistor impedance changes from a very high standby value to a very low conducting value, thus clamping the transient voltage to a safe level. The dangerous energy of the incoming high voltage pulse is absorbed by the varistor, which as shown in FIGS. 2 and 4 is connected directly across the opposite sides of the circuit, thus to protect voltage sensitive circuit components of television receivers or other electrical appliances that may be plugged into the receptacle at the contact carrying end thereof.

A varistor of the type described has a maximum rating, in the steady state, of 150 volts, RMS applied voltage; 212 volts, as recurrent peak idle voltage; and 200 volts, DC applied voltage. In the transient state, the rating is as follows: energy-20 Joules; average power dissipation, 0.85 watts; and peak pulse current, 4,000 amperes. The characteristics of the varistor peak voltage are, at 1 MA AC peak, 212 minimum and 282 maximum; and the capacitance is rated at 1,600 picofarads.

It is not believed necessary to describe the usages of devices of this type, since it is sufficient to note that in typical circuits, peak voltages are experienced up to 6,000 volts, from transient problems which in some instances may be caused by parallel loads on the same branch of the distribution system, but more frequently may be caused by lightning or related electrical disturbances. An unprotected circuit, when a sudden transient voltage surge is imposed upon it, will cause, very often, heavy and sometimes permanent damage to expensive electrical appliances. It is, accordingly, important that effective impedance to the surge be provided, and the suppressor element having the characteristics described above offers that impedance and provides highly effective protection.

As previously indicated herein, the present invention does not involve an invention in the surge suppressing element itself, which as indicated can be purchased on the open market with the desired characteristics. The present invention, rather, has to do with an improvement wherein said suppressing element is incorporated directly within what would otherwise be a conventional duplex receptacle circuit configuration, typically at the end of a branch circuit, eliminating the need for separately manufactured protective devices that are plugged into a duplex receptacle. The device, in accordance with the present invention, can be installed by the electrician during initial wiring of a residence or commercial establishment, or alternatively, can be readily installed as a replacement part, merely by removing the existing duplex receptacle and substituting one as illustrated and described herein. When installed in a branch circuit, the device also protects conventional receptacles installed "down line."

As will be noted a varistor of the type illustrated is a relatively flat device of circular or generally circular configuration, and is formed with closely spaced wire leads 66,68. In accordance with the present invention lead 66 is a short lead while lead 68 is a long lead, said leads being soldered or otherwise permanently, electrically connected to the respective terminals 60,62 defined by the truncated leads 60,62 integral with legs 50,52 respectively.

The receptacle cover, as seen in FIG. 1, has a raised portion 70 similar to the portion 44, in the same configuration as found in conventional duplex receptacles. Portion 70, however, is completely closed, that is, in the mold the projections that would form the plug-prong-receiving slots are removed or omitted. On the outer face the legend "transient voltage surge suppressor" is then provided as shown in FIG. 1 as required by standards established for the industry.

The underside of the cover differs from conventional covers in the manner shown in FIG. 5. A transversely extending recess 72 is formed in the end of the cover that overlies the element 64, either by being molded in the part or by a secondary operation. Recess 72 receives the projecting side of the element, viewing the same as in FIG. 3. The walls of the recess 72 thus provide abutments which engage the element against deviation from its assigned position, and afford clearance for the element.

Referring to FIG. 2, the end of the body that receives the element 64 has its longitudinal barrier 74 extended only part of the distance that the barrier 37 extends. This is achieved as previously described by a simple secondary operation performed on a conventional, molded duplex receptacle body, and as a result, barrier 74 terminates short of transversely extending partition 76, so that a continuous, transversely disposed suppressor element compartment 78 results. Partition 76, and barrier 74 thus provide for positioning means for the inner portion of the element 64, that is, the portion that rests upon the bottom of the body, viewing the same as in FIG. 3.

In this way, the cover and the body cooperate to define walls at opposite sides of the suppressor element, along diametrically opposed edges of the element, for properly positioning the element and holding it against substantial deviation from its assigned position.

Movement of the element under vibratory forces that might be imposed upon the receptacle over a period of years, is thus substantially precluded, so that the soldered connections of the suppressor element leads to the wire lead terminals of the contact strips retain their integrity over the entire life of the device.

It will be seen that the device has the exterior configuration of a completely conventional duplex receptacle, in respect to the dimensions of a receptacle, meeting all industry requirements, and is capable of being installed during the building of an industrial or commercial establishment or residence, or alternatively, may be installed later with little difficulty. The entire device does not project from the wall any more than a conventional receptacle would project, and has none of the disadvantages that result from the use of separate voltage surge suppressing devices of the type that plug into an ordinary convenience outlet. There is no possibility of accidental removal of the device, or loss of the integrity of the electrical connections of the suppressor element to the branch circuit. Further, a wiring device manufacturer is enabled to manufacture the device comprised in the present invention, using existing tooling that is normally utilized in the manufacture and assembly of conventional duplex receptacles, said tooling being modified only to a very minor extent, and being particularly adapted for continuous production of both duplex receptacles and voltage surge suppression devices, with little more than the insertion or removal of punches, molding inserts, or the like. These are important advantages both from a manufacturing standpoint and from a functional or use standpoint. Particularly with respect to the functional values of the device, the construction is important in that it permits installation of the device in place of an ordinary duplex receptacle, for example at the end of a branch circuit, with maximum ease and speed.

More and more solid state equipment is being used in industrial, commercial, and residential applications. Typical are computers, point-of-purchase solid state cash registers, television and stereo receivers, test equipment, medical equipment, industrial controls, business machines, and security systems. The invention, when used to protect solid state equipment connected to the circuit in which the disclosed device is installed, causes voltage spikes or surges to be shunted through the varistor, which absorbs that energy and allows only a safe level to enter the protected equipment.

While particular embodiments of this invention have been shown in the drawings and described above, it will be apparent, that many changes may be made in the form, arrangement and positioning of the various elements of the combination. In consideration thereof it should be understood that preferred to be illustrative only and not intended to limit the scope of the invention.

I claim:

1. In an electrical wiring device of the type intended for use in suppressing transient surges of voltage, and utilizing a voltage-sensitive surge suppressing element connected between the hot and neutral sides of an electrical wall outlet of the kind having a body, a cover proportioned to engage in a wall plate, and contact strips housed within the body, the improvement comprising:

(a) a body exteriorly configured similarly to that of a duplex receptacle installable in an electrical power circuit;

(b) hot and neutral contact strips seated in the body, the strips being provided at one end with attachment-plug-prong-receiving contact means for connecting to the circuit an attachment plug of an electrical appliance, the strips being formed at their other ends with wire lead terminals;

(c) a cover on the body configured similarly to that of a duplex receptacle and cooperating with the body in defining an electrically insulative housing for the contact strips, the cover having raised portions at its ends proportioned to seat in complementarily shaped openings of a duplex receptacle wall plate, the body having a pair of contact compartments underlying one of the raised portions and having a suppressor compartment underlying the other raised portion, the strips extending longitudinally within the body from the contact compartments to the suppressor compartment, said one end of the strips being disposed within the contact compartments and the other ends of the strips being disposed within the suppressor compartments, one of the raised portions having slots registered with the prong-receiving contact means of the strip for insertion of the prongs of an attachment plug, the other raised portion being wholly closed; and (d) a voltage-surge-suppressing element underlying said other raised portion and having wire leads permanently connected to the respective wire lead terminals of the contact strips.

2. An improvement in electrical wiring devices as in claim 1 wherein each of the contact strips is formed at its opposite ends with laterally inwardly extending legs one of which is integral with the prong-receiving contact means of the strip, and the other of which is integral with the wire lead terminal thereof.

3. A wiring device improvement as in claim 2 wherein the contact means of each strip is in the form of a plurality of leaves spreadable by an inserted prong of the attachment plug, the wire lead terminal of the strip comprising one only of said leaves.

4. A wiring device improvement as in claim 3 wherein the leaf of each contact strip that constitutes the wire lead terminal thereof is a duplicate of the corresponding leaf provided at the other end of the strip as part of the contact means.

5. A wiring device improvement as in any of claims 1 through 4 wherein the cover is formed, on the underside of said other raised portion, with a recess proportioned to receive the surge suppressing element and engage the same against substantial movement.

6. A wiring device improvement as in claim 5 wherein the body is formed at one end with a longitudinal barrier dividing the body at said end into said compartments for receiving the contact means, the body at its other end having a correspondingly located barrier cut away for part of its length to provide said suppressor element compartment as a continuous compartment in which the suppressor element is disposed transversely of the body.

7. A wiring device improvement as in claim 6 in which the suppressor element compartment has opposed walls one of which is defined by the second named barrier, the body including a transverse partition defining the other wall, said recess of the cover extending transversely thereof in general alignment with the suppressor element compartment, the suppressor element being engaged at opposite edges thereof by the walls of the recess and the walls of the suppressor element compartment, respectively.

* * * * *